(12) United States Patent
Ha et al.

(10) Patent No.: US 9,854,031 B2
(45) Date of Patent: Dec. 26, 2017

(54) CLOUD SERVICE AGENT BASED ON SERVICE LEVEL AGREEMENT(SLA)

(71) Applicant: Electronics and Telecommunications Research Institute, Daejeon-si (KR)

(72) Inventors: Su Wook Ha, Daejeon-si (KR); Kang Chan Lee, Daejeon-si (KR); Min Kyo In, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 281 days.

(21) Appl. No.: 14/926,263

(22) Filed: Oct. 29, 2015

(65) Prior Publication Data

US 2016/0156527 A1 Jun. 2, 2016

(30) Foreign Application Priority Data

Nov. 27, 2014 (KR) .......................... 10-2014-0167014

(51) Int. Cl.
  *G06F 15/16* (2006.01)
  *H04L 29/08* (2006.01)
  *H04L 12/24* (2006.01)

(52) U.S. Cl.
  CPC .......... *H04L 67/10* (2013.01); *H04L 41/5003* (2013.01); *H04L 41/5009* (2013.01); *H04L 41/5041* (2013.01); *H04L 41/5096* (2013.01)

(58) Field of Classification Search
  USPC ....... 709/202, 203, 204, 206, 217, 219, 221, 709/222, 223, 224, 226, 228, 231, 232, 709/238; 717/124; 726/2; 705/26.41
  See application file for complete search history.

(56) References Cited

U.S. PATENT DOCUMENTS

| | | | | |
|---|---|---|---|---|
| 9,674,055 | B2* | 6/2017 | Letca | G06F 21/6218 |
| 2012/0060212 | A1* | 3/2012 | Inoue | G06F 9/5038 |
| | | | | 709/226 |
| 2013/0066940 | A1 | 3/2013 | Shao | |
| 2013/0152047 | A1* | 6/2013 | Moorthi | G06F 11/368 |
| | | | | 717/124 |
| 2014/0368859 | A1* | 12/2014 | Gutnik | G06F 3/1206 |
| | | | | 358/1.14 |
| 2014/0372528 | A1* | 12/2014 | Nishiguchi | H04L 47/70 |
| | | | | 709/204 |

(Continued)

*Primary Examiner* — Quang N Nguyen
(74) *Attorney, Agent, or Firm* — Kile Park Reed & Houtteman PLLC (57) ABSTRACT

Provided is a cloud service agent based on a Service Level Agreement (SLA). The cloud service agent includes: a cloud service user manager configured to manage information on cloud service users; a cloud service manager configured to register cloud services provided by cloud service providers, and to generate and manage virtual cloud services based on the registered cloud services; a cloud service SLA broker configured to manage a matrix of an Service Level Agreement (SLA) of the cloud services, to measure a quality of the cloud services, and to provide information on the SLA or on the measured quality; and a cloud service executor configured to execute the virtual cloud services generated by the cloud service manager and to provide a result of the execution to the cloud service users.

19 Claims, 9 Drawing Sheets

(56) References Cited

U.S. PATENT DOCUMENTS

| 2015/0127795 | A1* | 5/2015 | Jagana | H04L 41/5096 709/223 |
| 2015/0128215 | A1* | 5/2015 | Son | H04L 67/1097 726/2 |
| 2015/0134485 | A1* | 5/2015 | Kim | H04L 41/5009 705/26.41 |

* cited by examiner

| VIRTUAL CLOUD SERVICE (AGENT) | CLOUD SERVICE (PROVIDER) |
|---|---|
| http://Agent/I | http://Provider_A/1 |
| http://Agent/II | http://Provider_A/2 |
| http://Agent/III | http://Provider_C/3 |
| http://Agent/IV | http://Provider_B/1 |
| ... | ... |

FIG. 9

| VIRTUAL CLOUD SERVICE (AGENT) | CLOUD SERVICE (PROVIDER) | SUBSTITUTE CLOUD SERVICE (PROVIDER) IN CASE OF FAILURE |
|---|---|---|
| http://Agent/I | http://Provider_A/1 | NONE |
| http://Agent/II | {http://Provider_B/1, http://Provider_A/2, or http://Provider_B/2} | NONE |
| http://Agent/III | {http://Agent/IV, http://Provider_A/2, http://Provider_B/2} | {http://Provider_B/1 \| http://Provider_A/2 \| http://Provider_B/4} |
| | http://Provider_C/3 | {http://Agent/IV \| http://Provider_A/2 \| http://Provider_B/4} |
| http://Agent/IV | http://Provider_B/1 | [http://Provider_C/1] |
| ... | ... | ... |

CLOUD SERVICE AGENT BASED ON SERVICE LEVEL AGREEMENT(SLA)

CROSS-REFERENCE TO RELATED APPLICATION(S)

This application claims priority from Korean Patent Application No. 10-2014-0167014, filed on Nov. 27, 2014, in the Korean Intellectual Property Office, the entire disclosure of which is incorporated herein by reference for all purposes.

BACKGROUND

1. Field

The following description generally relates to a cloud service technology, and more particularly to a cloud service agent based on Service Level Agreement (SLA).

2. Description of the Related Art

Cloud computing provides users with services of virtualized IT resources through the Internet, in which users borrow as many IT resources (e.g., application services, software, storage, server, network, etc.) as they need, may be provided with extendability in real time under system load, and may pay only as much for IT resources as they use. That is, cloud computing is a model for providing Internet Protocol-based IT services to users through the Internet anytime and anywhere when they need the services, regardless of a physical location and configuration of a system that provides the cloud services. Cloud computing is based on a user-focused concept that provides services on demand, in which users may use at a desired time as many IT resources as they need, and pay for resources according to usage. In this manner, users are provided with IT services of applications, platforms, resources, and the like from providers through a network. In cloud computing, users do not use programs or data stored in a PC or in a device of various types of terminals, or a limited number of users may use programs or data stored in a large computer, but users may perform necessary tasks by using terminals that are connected to a network regardless of time and place.

In an existing IT environment, there have been methodologies to guarantee quality of service (QOS) through the Service Level Agreement (SLA) that reflects users' demands. The SLA, which ensures a specific level of services provided from service providers to service users, is also applied to cloud computing. The SLA is used as a key business component in fulfilling an agreement and contract of cloud services between cloud service users and cloud service provides. In general, the SLA, which is used when cloud service providers make a contract with cloud service users to provide cloud services to them, includes a technical element to evaluate observance of the contract when using services, as well as a business element as a general agreement.

SUMMARY

The present disclosure provides a cloud service agent that provides cloud services to cloud service users according to the SLA made between cloud service providers and cloud service users.

In the present disclosure, the cloud service agent may provide seamless cloud services between cloud service providers and cloud service users.

Further, in the present disclosure, the cloud service agent may provide cloud services according to the SLA required by cloud service users when cloud services are provided between cloud service providers and cloud service users.

In addition, the cloud service agent may provide cloud services to cloud service users by mashing up one or more cloud services provided by one or more cloud service providers.

In one general aspect, there is provided a cloud service agent, including: a cloud service user manager configured to manage information on cloud service users; a cloud service manager configured to register cloud services provided by cloud service providers, and to generate and manage virtual cloud services based on the registered cloud services; a cloud service SLA broker configured to manage a matrix of an Service Level Agreement (SLA) of the cloud services, to measure a quality of the cloud services, and to provide information on the SLA or on the measured quality; and a cloud service executor configured to execute the virtual cloud services generated by the cloud service manager and to provide a result of the execution to the cloud service users.

The virtual cloud services may be provided by the cloud service agent to the cloud service users.

The cloud service user manager may include: an agent user manager configured to manage user information required to use the virtual cloud services provided by the cloud service agent; and a cloud service provider and user manager configured to manage user information required to use the cloud services provided by the cloud service providers.

The agent user manager may register and manage an SLA level required by the users of the cloud service agent and a quality of the virtual cloud services provided by the cloud service agent.

The cloud service provider and user manager may manage the user information required to use the cloud services provided by the cloud service providers by using identification (ID) information of the cloud service users to access the cloud service providers.

The cloud service manager may include: a cloud service registerer configured to register and manage the cloud services provided by the cloud service providers; a cloud service synthesizer configured to mash up one or more cloud services provided by the cloud service providers to generate one virtual cloud service; and a cloud service mapping manager configured to manage one or more of information on the cloud services registered by the cloud service registerer and information on the virtual cloud services generated by the cloud service synthesizer.

The cloud service registerer may register and manage the cloud services by using Uniform Resource Identifiers (URIs) of the cloud services provided by the cloud service providers.

The cloud service synthesizer may use a specific mark to indicate one virtual cloud service generated by mashing up the one or more cloud services.

The cloud service synthesizer may generate one virtual cloud service by mashing up one or more cloud services provided by the cloud service providers by using a previously generated virtual cloud service.

The cloud service manager may further include a cloud service substitute component configured to generate a substitute virtual cloud service that substitutes for the cloud services registered by the cloud service registerer or substitutes for the virtual cloud services generated by the cloud service synthesizers, in which the cloud service mapping manager may manage information on the substitute virtual cloud service generated by the cloud service substitute component. The cloud service substitute component may use a specific mark to indicate a substitute virtual cloud service generated to substitute for the cloud services or the virtual cloud services.

The cloud service SLA broker may separately manage an SLA between the cloud service agent and the cloud service providers and an SLA between the cloud service agent and the cloud service users, and provides information on the separated SLAs.

The SLA between the cloud service agent and the cloud service providers may be composed of measurable items. The measurable items may include one or more of: storage speeds, memory capacity and performance, computing speeds, network speeds, cloud service response time, and cloud service availability.

The SLA between the cloud service agent and the cloud service users may be composed of items capable of being provided to the cloud service users. The items capable of being provided to the cloud service users may include one or more of: virtual cloud service availability, network speeds, service catalogues, and service recovery time.

The cloud service SLA broker may include: an SLA matrix manager configured to manage a matrix of the SLA regarding the cloud service agent; a quality measuring component configured to measure and manage a quality of the cloud services provided by the cloud service providers; and an SLA retriever configured to retrieve the cloud services that satisfy an SLA level required by the cloud service users.

The SLA matrix manager may separately manage the SLA matrix between the cloud service agent and the cloud service providers and the SLA between the cloud service agent and the cloud service users.

The quality measuring component may measure, in real time, the quality of the cloud services provided by the cloud service providers, and may compare the measured quality with the SLA level required by the cloud service users.

The cloud service executor may include: a virtual cloud service execution order setter configured to set an order of executing the cloud services by using information on the virtual cloud services or information on the substitute virtual cloud services; a cloud service dispatcher configured to execute the cloud services according to the order of executing the cloud services that is set by the virtual cloud service execution order setter; and a virtual cloud service result generator configured to collect execution results of the cloud services executed by the cloud service dispatcher, and to generate a final execution result of the virtual cloud services by using the collected execution results.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the multi-angle view processing apparatus will be described in detail with reference to the accompanying drawings. The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Further, the terms used herein are defined in consideration of the functions of elements in the following embodiments, and can be changed according to the intentions or the customs of a user and an operator. Accordingly, the terms used in the following embodiments conform to the definitions described specifically in the present disclosure, and if there are no specific definitions, the terms should be interpreted as having the same meaning as commonly understood by one of ordinary skill in the art to which this invention pertains.

Figure 1:
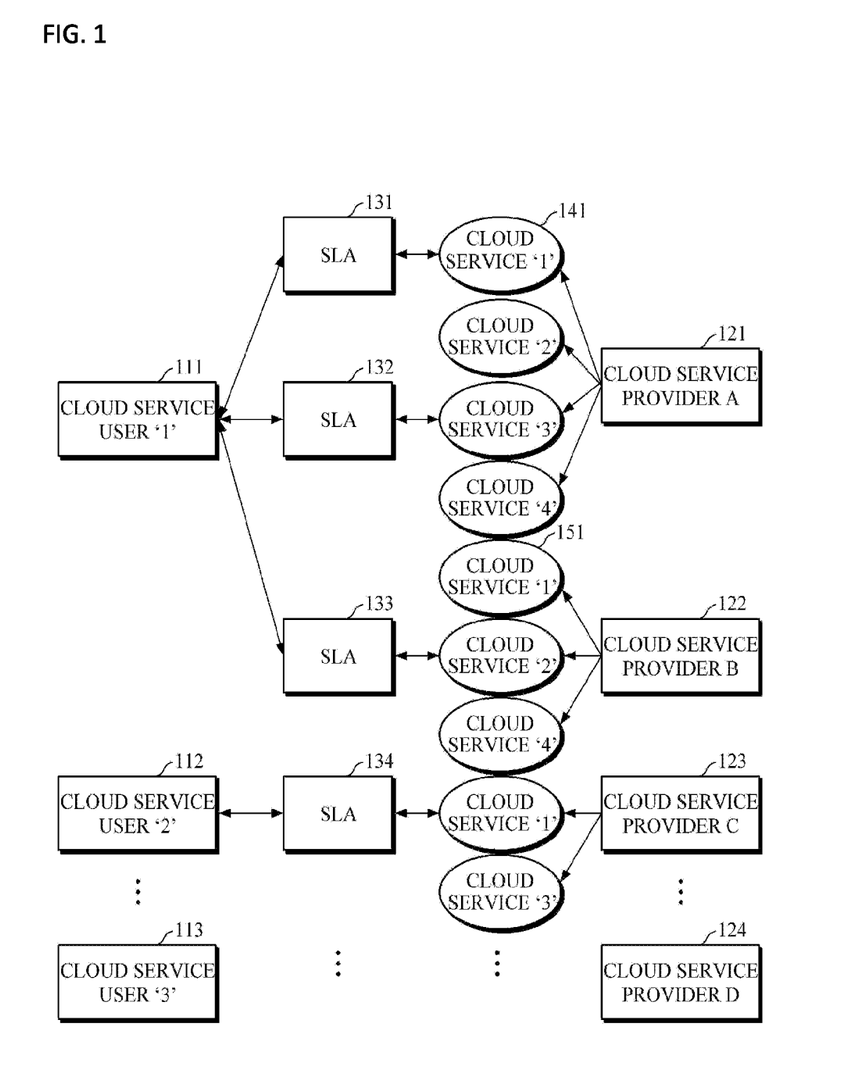
FIG. 1 is a conceptual diagram illustrating an SLA-based cloud service.

FIG. 1 is a conceptual diagram illustrating an SLA-based cloud service.

Referring to FIG. 1A, there are a plurality of cloud service providers, and each provider provides various types of cloud services. In general, a cloud service user and a specific cloud service provider make a direct contract to use a specific cloud service. For example, a cloud service user '1' 111 and a cloud service provider A 121 that provides a specific cloud service make a direct contract for use of a cloud service '1' 141. The cloud service user '1' 111 may use the cloud service '1' 141 provided by the cloud service provider A 121 according to a usage contract made between the cloud service user '1' 111 and the cloud service provider A 121. Once the cloud service user '1' 111 and the cloud service provider A 121 make a Service Level Agreement (SLA) for use of the cloud service '1' 141, the SLA 131 regarding the cloud service '1' 141 is an agreement that is dependent on the cloud service provider A 121.

Specifically, once a cloud service user has made a contract with a specific cloud service provider to use a specific cloud service, the user is required to use only the specific cloud service until the contract expires, even when there is another cloud service that guarantees a better SLA, or even when another cloud service provider provides a cloud service. In the above example, the cloud service user '1' 111 and the cloud service provider A 121 has made a contract for use of the cloud service '1' 141, such that the cloud service user '1' 111 may not use a cloud service '1' 151 provided by another cloud service provider B 122 unless the cloud service user '1' 111 makes a contract to use the cloud service '1' 151 with the cloud service provider B 122.

Further, in the case where a cloud service may not be normally provided to a cloud service user due to a failure and the like occurring in a specific cloud service provided by a specific cloud service provider, the failed cloud service may not be substituted dynamically even when a cloud service that is identical or similar to the specific cloud service is normally provided by other cloud service providers. In the above example, since the cloud service user '1' 111 has made a contract to use the cloud service '1' 141 with the cloud service provider A 121, the cloud service user '1' 111 may not use the cloud service '1' 151, which is identical to the cloud service '1' 141, and is normally provided by the cloud service provider B 122, in the case where the cloud service '1' 141 may not be provided normally by the cloud service provider A 121.

Figure 2:
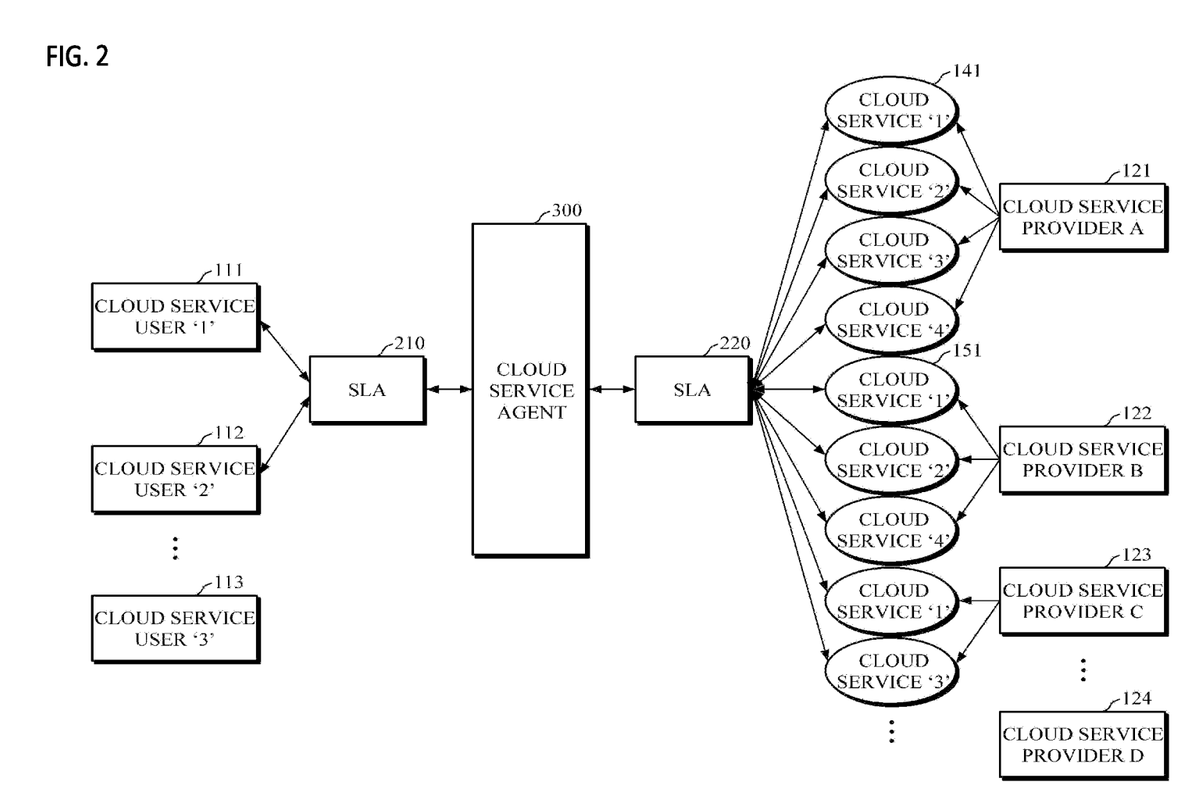
FIG. 2 is a conceptual diagram illustrating an SLA-based cloud service agent according to an exemplary embodiment.

FIG. 2 is a conceptual diagram illustrating an SLA-based cloud service agent according to an exemplary embodiment.

Referring to FIG. 2, the cloud service agent 300 is disposed between cloud service users 111, 112, and 113 and cloud service providers 121, 122, 123, and 124. The cloud service agent 300 provides cloud services to the cloud service users 111, 112, and 113 according to an SLA 210 made between the cloud service users 111, 112, and 113 and the cloud service agent 300, and according to an SLA 220 made between the cloud service agent 300 and the cloud service providers 121, 122, 123, and 124. In one exemplary embodiment, there are a plurality of cloud service providers, and each provider provides various types of cloud services. Hereinafter, a cloud service provided by the cloud service agent 300 to the cloud service users 111, 112, and 113 will be referred to as a "virtual cloud service".

The SLA that is associated with the cloud service agent 300 may be divided into the SLA 220 made with the cloud service providers 121, 122, 123, and 124, and the SLA 210 made with the cloud service users 111, 112, and 113.

First, the SLA 220 made between the cloud service agent 300 and the cloud service providers 121, 122, 123, and 124 is provided as data obtained by measuring each item of the SLA for cloud services provided by the cloud service providers 121, 122, 123, and 124. That is, the SLA 220 made between the cloud service agent 300 and the cloud service providers 121, 122, 123, and 124 include items that may be measured. For example, the items of the SLA for cloud services provided by the cloud service providers 121, 122, 123, and 124 may include storage speeds, memory capacity and performance, computing speeds, network speeds, cloud service response time, cloud service availability, and the like. The storage speed refers to a random or sequential access speed of a storage. The memory capacity and performance refer to a random or sequential access speed of a memory. The computing speed refers to a computing speed of a node for operations of cloud services, including MHz. The network speed refers to a network bandwidth. The cloud service response time refers to a period of time from a request of a cloud service to a response to the request. The cloud service availability refers to the percentage of time that a cloud service is available. However, the items of the SLA that may be measured for cloud services provided by the cloud service provider 121, 122, 123, and 124 are not limited thereto, and any items that are necessary for the SLA between the cloud service agent 300 and the cloud service providers 121, 122, 123, and 124 may be included.

Second, the SLA 210 made between the cloud service agent 300 and the cloud service users 111, 112, and 113 is provided, to the cloud service users 111, 112, and 113, as data of items of the SLA for a virtual cloud service provided by the cloud service agent 300. For example, regarding a virtual cloud service provided by the cloud service agent 300, the items of the SLA that may be provided to the cloud service users 111, 112, and 113 may include virtual cloud service availability, network speeds, service catalogues, service recovery time, and the like. The virtual cloud service availability refers to the percentage of time that a virtual cloud service is available. The network speed refers to a network bandwidth. The virtual cloud service catalogue refers to features of a virtual cloud service and substitutes for the service. The recovery time of a virtual cloud service refers to a period of time required to provide a virtual cloud service as a substitute for a cloud service that may not be provided normally by a cloud service provider. However, the items of the SLA for a virtual cloud service provided by the cloud service agent 300 to the cloud service users 111, 112, and 113 are not limited thereto, and any items that are necessary for the SLA between the cloud service agent 300 and the cloud service users 111, 112, and 113 may be included.

Figure 3:
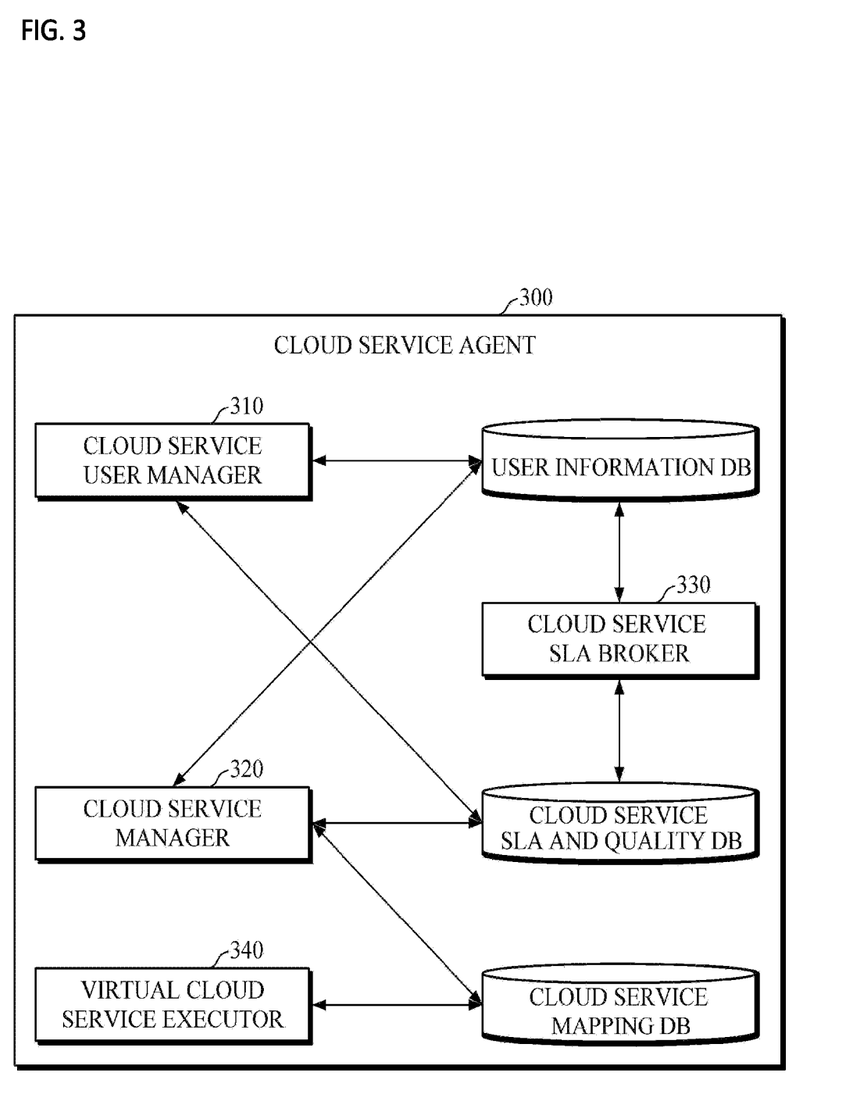
FIG. 3 is a block diagram schematically illustrating a cloud service agent according to an exemplary embodiment.

FIG. 3 is a block diagram schematically illustrating a cloud service agent according to an exemplary embodiment.

Referring to FIG. 3, the cloud service agent 300 includes a cloud service user manager 310, a cloud service manager 320, a cloud service SLA broker 330, and a virtual cloud service executor 340. The cloud service agent 300 is merely illustrative, such that the cloud service agent 300 may include some of the modules illustrated in FIG. 3, and/or may further include other modules necessary for its operation. For example, the cloud service agent 300 may further include a communicator to communicate with other devices, and the like. Alternatively, the cloud service agent 300 may further include a storage to store data regarding the cloud service agent 300.

In one exemplary embodiment, the cloud service user manager 310, the cloud service manager 320, the cloud service SLA broker 330, and the virtual cloud service executor 340 included in the cloud service agent 300 may be implemented by applications. It is obvious, in view of a current design technique, that these components may be implemented by a combination of software and hardware or by using only hardware such as dedicated logic and the like.

The cloud service user manager 310 manages information on cloud service users. The information on cloud service users may be stored and managed in a separate database.

The cloud service manager 320 registers cloud services provided by cloud service providers, and generates and manages virtual cloud services based on the registered cloud services. The SLA items of cloud services and information on the quality of cloud services may be stored and managed in a separate database. Further, Information on the generated virtual cloud services may be stored and managed in a separate database. Alternatively, the SLA items of the cloud services, the information on the quality of cloud services, and the information on the generated virtual cloud services may be managed in the form of different tables in an identical database.

In one exemplary embodiment, the virtual cloud service is a cloud service provided by the cloud service agent to the cloud service users.

The cloud service SLA broker 330 manages a matrix for the SLA of cloud services, measures the quality of cloud services, and provides information on the SLA or information on the measured quality of cloud services.

The virtual cloud service executor 340 executes a virtual cloud service generated by the cloud service manager 230, and provides an execution result of the virtual cloud service to a cloud service user. Specifically, the virtual cloud service executor 340 executes a cloud service by using the information on the virtual cloud services or substitute virtual cloud services managed by the cloud service manager 320, and provides execution results of the cloud services to the cloud service users. The information on the virtual cloud services or the information on substitute virtual cloud services may include an order and method of executing cloud services provided by the cloud service providers, and the like.

Figure 4:
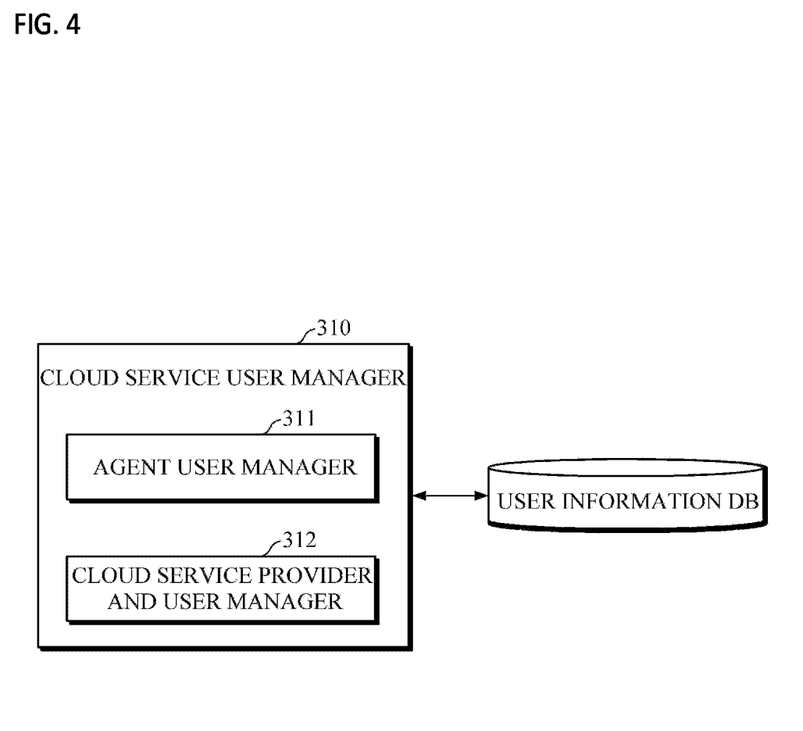
FIG. 4 is a block diagram schematically illustrating a cloud service user manager according to an exemplary embodiment.

FIG. 4 is a block diagram schematically illustrating a cloud service user manager according to an exemplary embodiment.

Referring to FIG. 4, the cloud service user manager 310 manages information on cloud service users. In one exemplary embodiment, the cloud service user manager 310 includes an agent user manager 311 and a cloud service provider and user manager 312.

The agent user manager 311 manages user information required to use virtual cloud services provided by the cloud service agent 300. Here, the management of user information includes registering user information with the cloud service agent 300, and changing or deleting the registered user information. The user information may include basic personal information that includes identifications (IDs), passwords, and the like of users, and information on SLA levels of virtual cloud services requested by users, and the like. For example, the SLA levels of virtual cloud services requested by a user may be actual values regarding SLA items required by a user.

In one exemplary embodiment, the agent user manager 311 may register an SLA level required by a user of the cloud service agent, and a quality level of virtual cloud services provided by the cloud service agent. The SLA level required by a user of the cloud service agent and the quality level of virtual cloud services provided by the cloud service agent may be stored and managed in a separate database.

The cloud service provider and user manager 312 manages user information required to use cloud services provided by cloud service providers. Specifically, the cloud service provider and user manager 312 manages user information of cloud service providers that is required for users, registered with the cloud service agent 300, to use cloud services provided by the cloud service providers through the cloud service agent 300. Here, the management of user information of the cloud service providers includes registering information on the cloud service providers with the cloud service agent 300, and changing or deleting the registered information on the cloud service providers. The user information of the cloud service providers includes information of the cloud service providers and information of the cloud service agent 300. Specifically, the user information of the cloud service providers includes URIs of the cloud service providers, an ID and a password of the cloud service agent 300 to access the cloud service providers, and the like. For example, the user information of the cloud service providers may include a cloud service URI of Google for the cloud service agent 300 to access cloud services provided by Google, an ID and a password of the cloud service agent that are provided by Google, and the like.

In one exemplary embodiment, the cloud service provider and user manager 312 may manage user information required to use cloud services provided by the cloud service providers by using ID information of cloud service users to access the cloud service providers. Here, the ID information of cloud service users to access the cloud service providers refers to information to identify cloud service users, including IDs and passwords of cloud service users generated when the users subscribe to the cloud service providers. That is, the cloud service agent may use cloud services provided by the cloud service providers by using the IDs and passwords generated for each cloud service user to access the cloud service providers.

Figure 5:
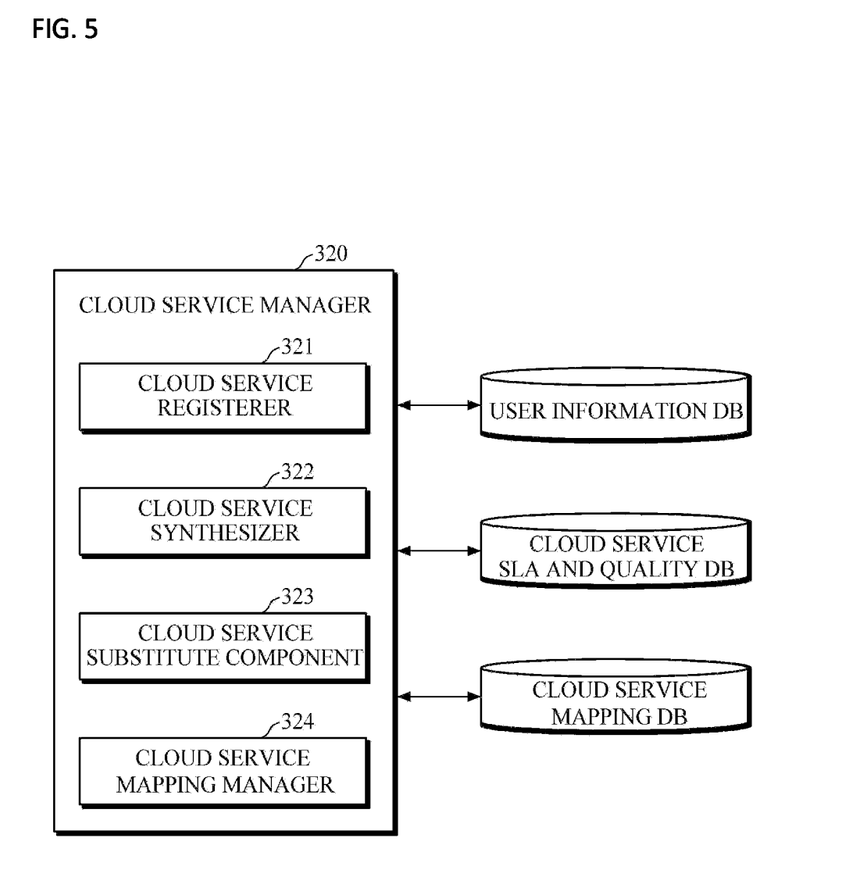
FIG. 5 is a block diagram schematically illustrating a cloud service manager according to an exemplary embodiment.

FIG. 5 is a block diagram schematically illustrating a cloud service manager according to an exemplary embodiment.

Referring to FIG. 5, the cloud service manager 320 registers cloud services provided by cloud service providers, and generates and manages a virtual cloud service based on the registered cloud services. In one exemplary embodiment, the cloud service manager 320 includes a cloud service registerer 321, a cloud service synthesizer 322, and a cloud service mapping manager 324. In another exemplary embodiment, the cloud service manager 320 may further include a cloud service substitute component 323.

The cloud service registerer 321 registers and manages cloud services provided by the cloud service providers. Here, the registration of cloud services includes generating one virtual cloud service provided by the cloud service agent 300 for one cloud service provided by one cloud service provider. That is, the registration of cloud services is performed in such a manner that one cloud service provided by one cloud service provider is mapped one-to-one to a virtual cloud service provided by the cloud service agent 300. Further, the management of cloud services include changing or deleting the registered cloud services, providing a list of the registered cloud services, or the like. The cloud services registered by the cloud service registerer 321 may include information on virtual cloud services.

In one exemplary embodiment, the cloud service registerer 321 may register and manage cloud services by using URIs of cloud services provided by the cloud service providers. For example, the cloud service registerer 321 may register and manage URIs of cloud services provided by the cloud service providers.

The cloud service synthesizer 322 may mash-up one or more cloud services provided by cloud service providers to generate one virtual cloud service. Here, the mashup refers to a web page or web application that uses content from web service providers or open API providers to create a single new service or combined application. For example, as in the case of combining search-related application interface (API), map-related API, and other various web service information that are made public by Google, and applying the combined information to the sales of real estate (e.g.: HousingMaps. com), the mashup is a web page or web application that combines content from more than one source to create a single new service.

The cloud service synthesizer 322 may mash-up one or more cloud services provided by cloud service providers to generate one virtual cloud service. For example, the cloud service synthesizer 322 may mashup a plurality of cloud services provided by one cloud service provider or virtual cloud services provided by the cloud service agent, to generate one virtual cloud service provided by the cloud service agent 300. In another example, the cloud service synthesizer 322 may mash-up a plurality of cloud services provided by a plurality of cloud service providers to generate one virtual cloud service provided by the cloud service agent 300. In yet another example, the cloud service synthesizer 322 may mash-up cloud services provided by cloud service providers according to users' demands or according to an SLA required by a user, to generate one virtual cloud service provided by the cloud service agent 300.

In one exemplary embodiment, the cloud service synthesizer 322 may use a specific mark to indicate a virtual cloud service generated by mashing up one or more cloud services. A method of using a specific mark to indicate one virtual cloud service generated by mashing up one or more cloud services will be described in detail later with reference to FIG. 9.

In another exemplary embodiment, the cloud service synthesizer 322 may mash up one or more cloud services provided by cloud service providers by using a previously generated virtual cloud service, to generate one virtual cloud service. A method of mashing up one or more cloud services generated by cloud service providers by using a previously generated virtual cloud service will be described in detail later with reference to FIG. 9.

The cloud service mapping manager 324 manages information on virtual cloud services generated by the cloud service registerer 321, or information on virtual cloud services generated by the cloud service synthesizer 322. The information on virtual cloud services may include mapping information. Here, the mapping information refers to information on a relationship between cloud service providers and cloud services provided by the cloud service providers, or information on a relationship between virtual cloud services provided by the cloud service agent and cloud services provided by the cloud service providers.

In one exemplary embodiment, the cloud service manager 320 may further include a cloud service substitute component 323.

The cloud service substitute component 323 generates a substitute virtual cloud service to substitute for cloud services registered by the cloud service registerer 321 or virtual cloud services generated by the cloud service synthesizer 322. For example, the cloud service substitute component 323 generates a substitute virtual cloud service that may substitute for a virtual cloud service in the case where the cloud service agent may not normally provide the virtual cloud service. Here, the case where the cloud service agent may not normally provide the virtual cloud service refers to a case where the cloud service agent may not normally provide a virtual cloud service due to a failure occurring in a virtual cloud service provided by the cloud service agent or a cloud service provided by the cloud service provider. The cloud service agent may provide cloud service users with seamless services by immediately providing a substitute virtual cloud service when a specific virtual cloud service is abnormal.

In this case, the cloud service mapping manager 324 manages information on substitute virtual cloud services generated by the cloud service substitute component 323. The information on substitute virtual cloud services may include mapping information. Here, the mapping information may indicate information on a relationship between virtual cloud services provided by the cloud service agent and substitute virtual cloud services.

In one exemplary embodiment, the cloud service substitute component 323 may use a specific mark to indicate a substitute virtual cloud service that is generated to substitute for a cloud service or a virtual cloud service. A method of using a specific mark to indicate a substitute virtual cloud service that is generated to substitute for a cloud service or a virtual cloud service will be described in detail later with reference to FIG. 9.

Figure 6:
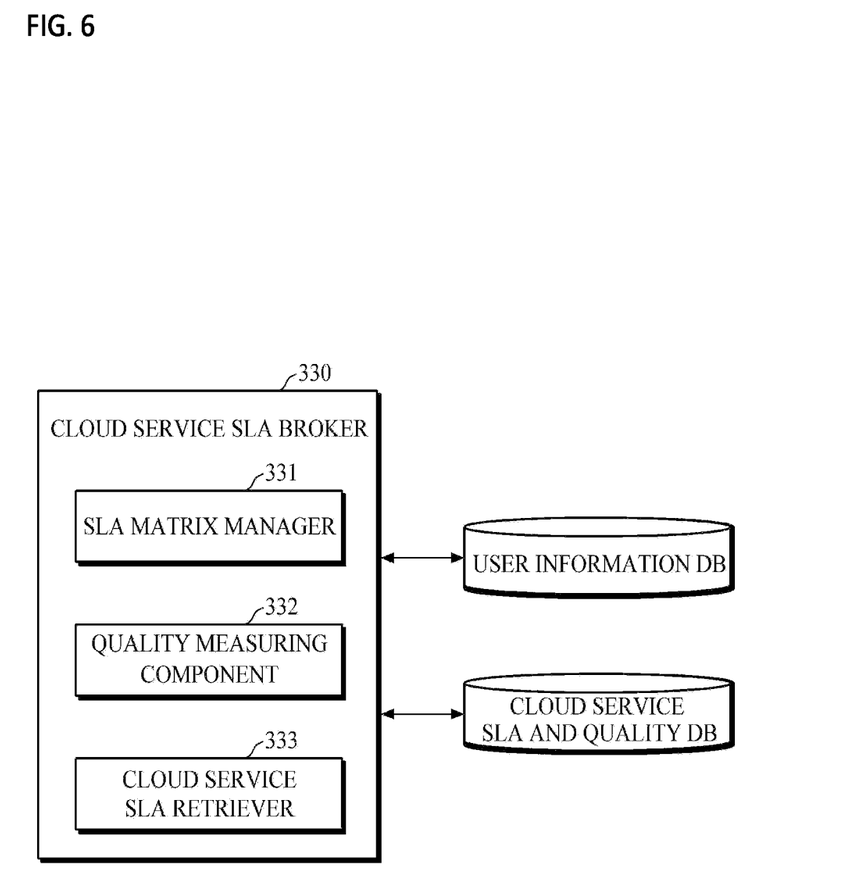
FIG. 6 is a block diagram schematically illustrating a cloud service SLA broker according to an exemplary embodiment.

FIG. 6 is a block diagram schematically illustrating a cloud service SLA broker according to an exemplary embodiment.

Referring to FIG. 6, the cloud service SLA broker 330 manages a matrix of an SLA for cloud services, measures the quality of cloud services, and provides information on the SLA or information on the measured quality.

In one exemplary embodiment, the cloud service SLA broker 330 separately manages the SLA between the cloud service agent and cloud service providers and the SLA between the cloud service agent and cloud service users, and may provide information on the separated SLAs.

In this case, the SLA between the cloud service agent and cloud service providers may be composed of items that may be measured. Examples of the items that may be measured may include one or more of storage speeds, memory capacity and performance, computing speeds, network speeds, cloud service response time, cloud service availability.

The SLA between the cloud service agent and cloud service users may be composed of items that may be provided to cloud service users. Examples of the items that may be provided to cloud service users may include one or more of virtual cloud service availability, network speeds, service catalogues, and service recovery time.

In another exemplary embodiment, the cloud service SLA broker 330 includes an SLA matrix manager 331, a quality measuring component 332, and a cloud service SLA retriever 333.

The SLA matrix manager 331 manages an SLA matrix regarding the cloud service agent. Here, the management of the SLA matrix includes registering SLA items with the cloud service agent, and changing or deleting information on the registered SLA items. The SLA matrix may include SLA items and SLA levels regarding the SLA items, in which the SLA levels may be actual values regarding the SLA items. For example, the SLA items of the SLA matrix may include storage speeds, memory capacity and performance, computing speeds, network speeds, cloud service response time, cloud service availability, virtual cloud service availability, service catalogues, service recovery time, and the like. In another example, the SLA levels of the SLA items of the SLA matrix may include actual values regarding the storage speeds, memory capacity and performance, computing speeds, network speeds, cloud service response time, cloud service availability, virtual cloud service availability, service catalogues, service recovery time, and the like.

In one exemplary embodiment, the SLA matrix manager 331 may separately manage the SLA matrix between the cloud service agent and the cloud service providers and the SLA matrix between the cloud service agent and the cloud service users.

In this case, the SLA matrix between the cloud service agent and the cloud service providers may be composed of items that may be measured. Examples of the items that may be measured may include one or more of storage speeds, memory capacity and performance, computing speeds, network speeds, cloud service response time, cloud service availability.

The SLA matrix between the cloud service agent and cloud service users may be composed of items that may be provided to cloud service users. Examples of the items that may be provided to cloud service users may include one or more of virtual cloud service availability, network speeds, service catalogues, and service recovery time.

The quality measuring component 332 measures the quality of cloud services provided by the cloud service providers. The quality measuring component 332 may measure the quality of cloud services provided by the cloud service providers in real time or at regular time intervals. When measuring the quality of cloud services, the quality measuring component 332 may measure the quality according to the SLA matrix managed by the SLA matrix manager 331.

In one exemplary embodiment, the quality measuring component 332 measures, in real time, the quality of cloud services provided by the cloud service providers, and may compare the measured quality with the SLA level required by cloud service users.

The cloud service SLA retriever 333 retrieves cloud services that satisfy an SLA level required by cloud service users. Alternatively, the cloud service SLA retriever 333 may retrieve cloud service providers that provide cloud services that satisfy an SLA level required by cloud service users.

Figure 7:
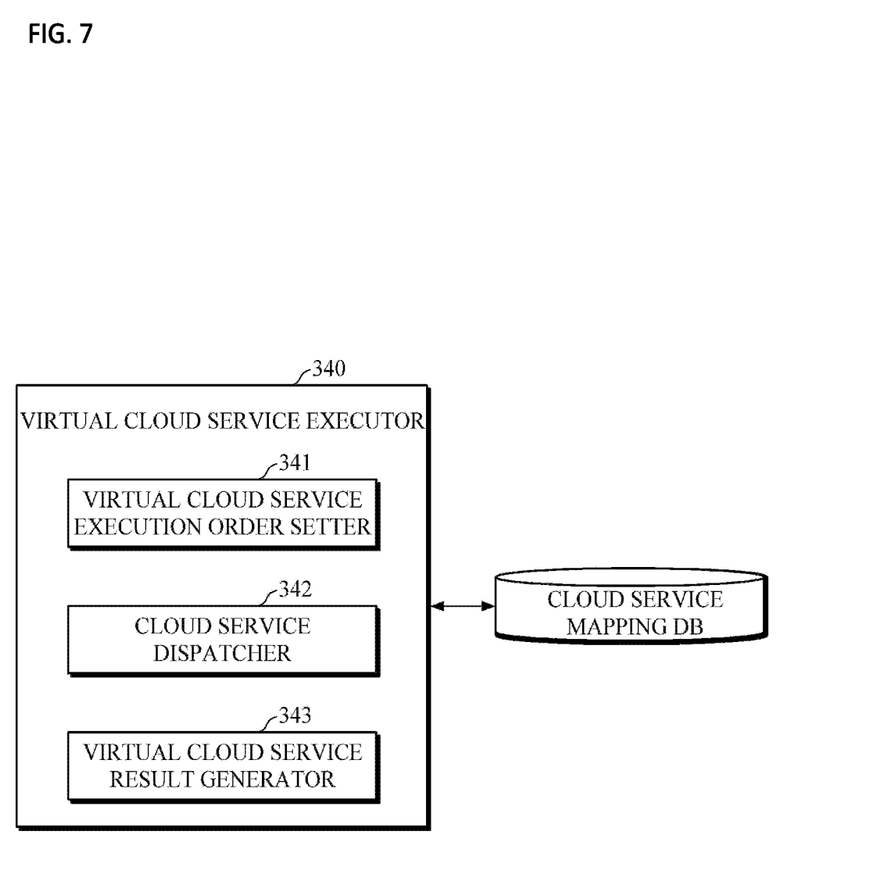
FIG. 7 is a block diagram schematically illustrating a virtual cloud service executor according to an exemplary embodiment.

FIG. 7 is a block diagram schematically illustrating a virtual cloud service executor according to an exemplary embodiment.

Referring to FIG. 7, the virtual cloud service executor 340 executes a virtual cloud service generated by the cloud service manager 320, and may provide an execution result of the virtual cloud service to a user. Specifically, the virtual cloud service executor 340 executes a virtual cloud service by using information on virtual cloud services or information on substitute virtual cloud services managed by the cloud service mapping manger 324, and may provide an execution result to cloud service users. The information on virtual cloud services or the information on substitute virtual cloud services may include an order and a method of executing cloud services provided by cloud service providers, and the like. The virtual cloud service executor 340 may include a virtual cloud service execution order setter 341, a cloud service dispatcher 342, and a virtual cloud service result generator 343.

The virtual cloud service execution order setter 341 may set an order of executing cloud services by using the information on virtual cloud services or information on substitute virtual cloud services. The information on virtual cloud services or the information on substitute virtual cloud services may be information managed by the cloud service mapping manager 324. For example, in the case where a virtual cloud service provided by the cloud service agent is a cloud service generated by mashing up cloud services provided by the cloud service providers, the virtual cloud service execution order setter 341 may set an order of executing the mashed-up cloud services.

The cloud service dispatcher 342 executes cloud services according to the order of executing cloud services that is set by the virtual cloud service execution order setter 341. For example, in the case where a virtual cloud service provided by the cloud service agent is a cloud service generated by mashing up cloud services provided by the cloud service providers, the virtual cloud service execution order setter 341 sets an execution order of executing the mashed-up cloud services, and the cloud service dispatcher 342 executes each mashed-up cloud service according to an execution order set by the virtual cloud service execution order setter 341. In another example, if there is no execution order of executing the mashed-up cloud services, the cloud service dispatcher 342 may execute all the mashed-up cloud services at the same time.

The virtual cloud service result generator 343 may collect execution results of cloud services executed by the cloud service dispatcher 342, and may generate a final execution result of virtual cloud services by using the collected execution results. The virtual cloud service result generator 343 may collect execution results of each mashed-up cloud service.

Figure 8:
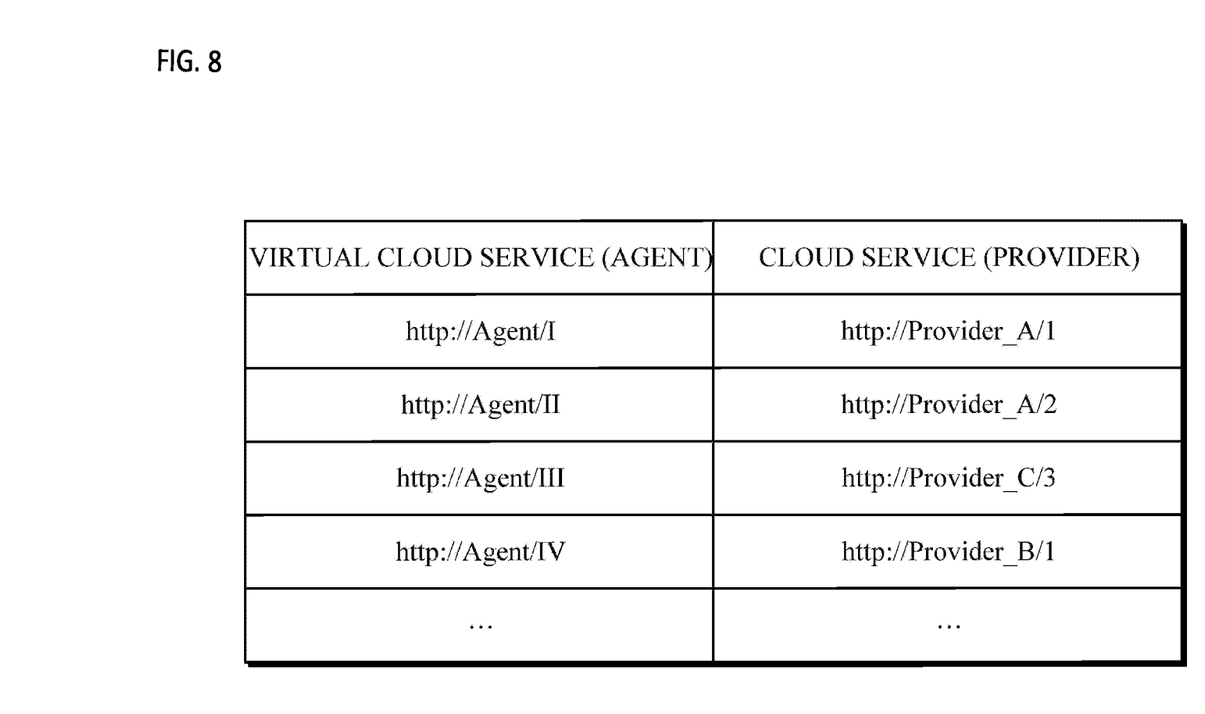
FIG. 8 is a diagram illustrating information managed by a cloud service mapping manager according to an exemplary embodiment.

FIG. 8 is a diagram illustrating information managed by a cloud service mapping manager according to an exemplary embodiment.

Referring to FIG. 8, cloud service mapping information may include information on virtual cloud services and information on cloud services. Specifically, the cloud service mapping information may include virtual cloud services and cloud services. Cloud services may be registered based on URIs of the cloud services provided by the cloud service providers. Here, the registration of cloud services refers to generating one virtual cloud service, which is identical to one cloud service provided by one cloud service provider, and is provided by the cloud service agent. That is, the registration of cloud services is performed in such a manner that one cloud service provided by one cloud service provider is mapped one-to-one to one virtual cloud service provided by the cloud service agent.

For example, virtual cloud service '1' provided by the cloud service agent is identical to cloud service '1' provided by cloud service provider A. The virtual cloud service '1' is mapped to the cloud service "1" provided by cloud service provider A. The virtual cloud service 'I' may be represented as 'http://Agent/I'.

In another example, virtual cloud service 'II' provided by the cloud service agent is identical to cloud service '2' provided by cloud service provider A. The virtual cloud service 'II' is mapped to the cloud service '2' provided by cloud service provider A. The virtual cloud service 'II' may be represented as 'http://Agent/II'.

In yet another example, virtual cloud service 'III' provided by the cloud service agent identical to cloud service '3' provided by cloud service provider C. The virtual cloud service 'III' is mapped to the cloud service '3' provided by cloud service provider C. The virtual cloud service 'III' may be represented as 'http://Agent/III'.

In still another example, virtual cloud service 'IV' provided by the cloud service agent identical to cloud service '1' provided by cloud service provider B. The virtual cloud service T is mapped to the cloud service '1' provided by cloud service provider B. The virtual cloud service 'IV' may be represented as 'http://Agent/IV'.

Here, a method of mapping, one-to-one, one virtual cloud service provided by the cloud service agent to one cloud service provided by one cloud service provider is not limited thereto.

Figure 9:
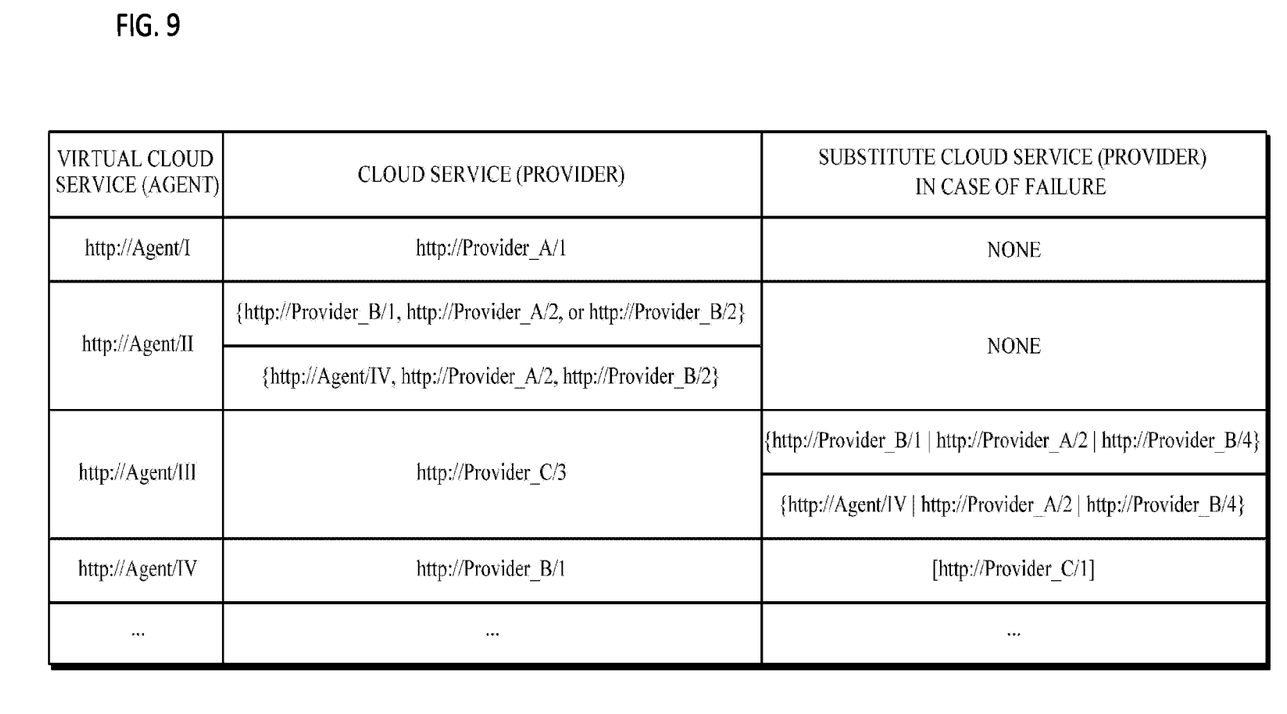
FIG. 9 is a diagram illustrating information managed by a cloud service mapping manager according to another exemplary embodiment.

FIG. 9 is a diagram illustrating information managed by a cloud service mapping manager according to another exemplary embodiment.

Referring to FIG. 9, the cloud service mapping information may include information on virtual cloud services and information on cloud services. Specifically, the cloud service mapping information may be composed of virtual cloud services, cloud services, and substitute virtual cloud services. Cloud services are registered based on URIs of cloud services provided by the cloud service providers.

The synthesis of cloud service, i.e., mash-up thereof may be indicated by using marks, such as '{ }', ',', 'l', '[ ]' and the like. However, the marks that indicate the mash-up are not limited thereto, and any marks that may indicate the synthesis of cloud services may be used.

The mark '{ }' indicates that cloud services are mashed up, and '[ ]' indicates that data are mashed up so that not only the cloud services but also data required to use the cloud services may be substituted. When virtual cloud services are provided by using '{ }' and '[ ]', it may be determined whether services are provided with interfaces only or with data stored in the services.

The mark ',' indicates that there is an order of executing the mashed-up cloud services. For example, the virtual cloud service 'II' provided by the cloud service agent may be generated by mashing up cloud services '1' and '2' provided by the cloud service provider B and the cloud service '2' provided by the cloud service provider A. The virtual cloud service 'II' provided by the cloud service agent is identical to a service provided in such a manner that a result of the cloud service '1' provided by the cloud service provider B is transmitted from the cloud service "2" provided by the cloud service provider A and is processed, and then the result is transmitted from the cloud service "2" provided by the cloud service provider B. The virtual cloud service 'II' may be represented as '{http://Provider_B/1, http://Provider_A/2, or http://Provider_B/2}'.

The cloud service '1' provided by the cloud service provider B is mapped to the virtual cloud service 'IV' provided by the cloud service agent. In the above example, the virtual cloud service 'II' may be represented as '{http://Agent/IV, http://Provider_A/2, http://Provider_B/2}'.

The mark '|' indicates that there is no order of executing the mashed-up cloud services. For example, the virtual cloud service 'III' provided by the cloud service agent is identical to the cloud service '3' provided by the cloud service provider C. The virtual cloud service 'III' is mapped to the cloud service '3' provided by the cloud service provider C. The virtual cloud service 'III' may be represented as 'http://Agent/III'.

In the case where the cloud service '3' provided by the cloud service provider C is not provided normally, a substitute virtual cloud service that substitutes for the cloud service may be generated. The substitute virtual cloud service may be generated by mashing up cloud services '1' and '4' provided by the cloud service provider B and the cloud service '2' provided by the cloud service provider A. The substitute virtual cloud service 'III' provided by the cloud service agent may be generated by processing, without an order, the cloud service '1' provided by the cloud service provider B, the cloud service '2' provided by the cloud service provider A, and the cloud service '4' provided by the cloud service provider B. The substitute virtual cloud service 'III' may be represented as {http://Provider_B/1|http://Provider_A/2|http://Provider_B/4}'.

The mark '[ ]' indicates that data is mashed up so that not only the cloud services but also data required to use the cloud services may be substituted.

For example, the virtual cloud service 'IV' provided by the cloud service agent is identical to the cloud service '1' provided by the cloud service provider B. The virtual cloud service 'IV' is mapped to the cloud service '1' provided by the cloud service provider B. The virtual cloud service 'IV' may be represented as 'http://Agent/IV'.

In the case where the cloud service '1' provided by the cloud service provider B is not provided normally, a substitute virtual cloud service that substitutes for the cloud service may be generated. The substitute virtual cloud service is mapped to the cloud service '1' provided by the cloud service provider C. In this case, as the mark '[ ]' is used, the cloud service '1' provided by the cloud service provider C may substitute for a cloud service, and data required to use the substitute service may be prepared in advance.

As described above, the cloud service agent between cloud service providers and cloud service users may provide cloud services to the cloud service users according to the SLA.

Further, the cloud service agent between cloud service providers and cloud service users may provide seamless cloud services.

In addition, the cloud service agent between cloud service providers and cloud service users may provide cloud services according to the SLA required by the cloud service users when cloud services are provided between cloud service providers and cloud service users.

Moreover, the cloud service agent between cloud service providers and cloud service users may provide cloud services to cloud service users by mashing up cloud services provided by the cloud service providers.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus the present invention is not limited thereto.

What is claimed is:

1. A cloud service agent, comprising:
a processor coupled to a storage device;
a cloud service user manager configured to manage information on cloud service users;
a cloud service manager configured to register cloud services provided by cloud service providers, and to generate and manage virtual cloud services based on the registered cloud services;
a cloud service SLA broker configured to manage a matrix of an Service Level Agreement (SLA) of the cloud services, to measure a quality of the cloud services, and to provide information on the SLA or on the measured quality; and
a cloud service executor configured to execute the virtual cloud services generated by the cloud service manager and to provide a result of the execution to the cloud service users;
wherein the cloud service executor comprises:
a virtual cloud service execution order setter configured to set an order of executing the cloud services by using information on the virtual cloud services or information on the substitute virtual cloud services;
a cloud service dispatcher configured to execute the cloud services according to the order of executing the cloud services that is set by the virtual cloud service execution order setter; and
a virtual cloud service result generator configured to collect execution results of the cloud services executed by the cloud service dispatcher, and to generate a final execution result of the virtual cloud services by using the collected execution results.

2. The cloud service agent of claim 1, wherein the virtual cloud services are provided by the cloud service agent to the cloud service users.

3. The cloud service agent of claim 1, wherein the cloud service user manager comprises:

an agent user manager configured to manage user information required to use the virtual cloud services provided by the cloud service agent; and a cloud service provider and user manager configured to manage user information required to use the cloud services provided by the cloud service providers.

4. The cloud service agent of claim 3, wherein the agent user manager registers and manages an SLA level required by the users of the cloud service agent and a quality of the virtual cloud services provided by the cloud service agent.

5. The cloud service agent of claim 3, wherein the cloud service provider and user manager manages the user information required to use the cloud services provided by the cloud service providers by using identification (ID) information of the cloud service users to access the cloud service providers.

6. The cloud service agent of claim 1, wherein the cloud service manager comprises:
a cloud service registerer configured to register and manage the cloud services provided by the cloud service providers;
a cloud service synthesizer configured to mash up one or more cloud services provided by the cloud service providers to generate one virtual cloud service; and
a cloud service mapping manager configured to manage one or more of information on the cloud services registered by the cloud service registerer and information on the virtual cloud services generated by the cloud service synthesizer.

7. The cloud service agent of claim 6, wherein the cloud service registerer registers and manages the cloud services by using Uniform Resource Identifiers (URIs) of the cloud services provided by the cloud service providers.

8. The cloud service agent of claim 6, wherein the cloud service synthesizer uses a specific mark to indicate one virtual cloud service generated by mashing up the one or more cloud services.

9. The cloud service agent of claim 6, wherein the cloud service synthesizer generates one virtual cloud service by mashing up one or more cloud services provided by the cloud service providers by using a previously generated virtual cloud service.

10. The cloud service agent of claim 6, wherein the cloud service manager further comprises a cloud service substitute component configured to generate a substitute virtual cloud service that substitutes for the cloud services registered by the cloud service registerer or substitutes for the virtual cloud services generated by the cloud service synthesizers, wherein the cloud service mapping manager manages information on the substitute virtual cloud service generated by the cloud service substitute component.

11. The cloud service agent of claim 10, wherein the cloud service substitute component uses a specific mark to indicate a substitute virtual cloud service generated to substitute for the cloud services or the virtual cloud services.

12. The cloud service agent of claim 1, wherein the cloud service SLA broker separately manages an SLA between the cloud service agent and the cloud service providers and an SLA between the cloud service agent and the cloud service users, and provides information on the separated SLAs.

13. The cloud service agent of claim 12, wherein the SLA between the cloud service agent and the cloud service providers is composed of measurable items.

14. The cloud service agent of claim 13, wherein the measurable items includes one or more of: storage speeds, memory capacity and performance, computing speeds, network speeds, cloud service response time, and cloud service availability.

15. The cloud service agent of claim 12, wherein the SLA between the cloud service agent and the cloud service users is composed of items capable of being provided to the cloud service users.

16. The cloud service agent of claim 15, wherein the items capable of being provided to the cloud service users includes one or more of: virtual cloud service availability, network speeds, service catalogues, and service recovery time.

17. The cloud service agent of claim 1, wherein the cloud service SLA broker comprises:
an SLA matrix manager configured to manage a matrix of the SLA regarding the cloud service agent;
a quality measuring component configured to measure and manage a quality of the cloud services provided by the cloud service providers; and
an SLA retriever configured to retrieve the cloud services that satisfy an SLA level required by the cloud service users.

18. The cloud service agent of claim 17, wherein the SLA matrix manager separately manages the SLA matrix between the cloud service agent and the cloud service providers and the SLA between the cloud service agent and the cloud service users.

19. The cloud service agent of claim 17, wherein the quality measuring component measures, in real time, the quality of the cloud services provided by the cloud service providers, and compares the measured quality with the SLA level required by the cloud service users.

* * * * *